United States Patent Office 3,133,896
Patented May 19, 1964

3,133,896
OXYMETHYLENE POLYMERS STABILIZED WITH CYCLOALIPHATIC AMINES AND SALTS THEREOF
Thomas J. Dolce, Summit, and Frank M. Berardinelli, South Orange, N.J., assignors to Celanese Corporation of America, New York, N.Y., a corporation of Delaware
No Drawing. Filed Jan. 11, 1960, Ser. No. 1,457
14 Claims. (Cl. 260—45.85)

This invention relates to polymers which are structurally related to polyoxymethylene and particularly to polymers of high thermal stability. This invention also relates to a method for improving the thermal stability of polymers.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Serial No. 691,143, filed October 21, 1957, by Hudgin and Berardinelli.

Although polyoxymethylenes prepared by some methods are much more stable against thermal degradation than those prepared by other methods, it is nevertheless desirable for many uses that the thermal stability be increased.

In accordance with the present invention the heat stability of oxymethylene polymers is enhanced by the incorporation therein of a cycloaliphatic compound of the group consisting of amines having only cycloaliphatic substitutes on their nitrogen atoms, amines having both cycloaliphatic and aliphatic substituents on their nitrogen atoms and salts of the aforementioned amines with carboxylic acids.

The cycloaliphatic amine compounds suitable for this invention include compounds of the formula

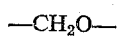

wherein R$_1$ is a cycloaliphatic radical and R$_2$ and R$_3$ are each selected from the group consisting of cycloaliphatic radicals, aliphatic radicals and hydrogen. The cycloaliphatic amines include cyclobutylamine, cyclopentylamine, cyclohexylamine, cycloheptylamine, decahydronaphthylamine, dicyclohexylamine, N-ethyl-cyclohexylamine, N-butyl-cyclohexylamine, dicyclopentylamine, tricyclohexylamine and N-ethyl-dicyclohexylamine.

The cycloaliphatic amine compounds may be used as such or may be used in the form of salts with carboxylic acids, such as acetic acid, propionic acid, formic acid, lactic acid, citric acid and carbonic acid.

In accordance with a preferred aspect of this invention, the aforesaid cycloaliphatic amine compound is incorporated into a copolymer containing oxymethylene groups and oxyalkylene groups having adjacent carbon atoms, and particularly copolymers containing from 60 to 99.6 mol percent of recurring oxymethylene groups. It appears that the susceptibility of oxymethylene polymers to thermal stabilization by the addition of the aforementioned cycloaliphatic amine compound is enhanced by incorporating into the polymer oxyalkylene units having adjacent carbon atoms and derived from cyclic ethers having adjacent carbon atoms.

Among the copolymers which are utilized in accordance with this aspect of the invention are those having a structure comprising recurring units having the formula

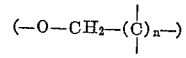

wherein $n$ is an integer from zero to 5 and wherein $n$ is zero in from 60 to 99.6 percent of the recurring units.

A preferred class of copolymers are those having a structure comprising oxymethylene and oxyethylene units and having from 60 to 99.6 percent of recurring oxymethylene units. These copolymers are prepared by copolymerizing trioxane with a cyclic ether having the structure:

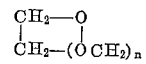

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran and butadiene monoxide.

The preferred catalysts used in the preparation of the desired copolymers are the boron fluoride coordinate complexes with organic compounds in which oxygen or sulfur is the donor atom.

The coordinate complex of boron fluoride may, for example, be a complex with a phenol, an ether, an ester or a diakyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenol acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In preparing the copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total moles of monomer. The optimum proportion will depend on the particular copolymer desired, the expected degree of conversion and the chemical constitution of the cyclic ether used.

The copolymers produced from the preferred cyclic ethers in accordance with this aspect of the invention have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction produuct may be washed with water which neutralizes catalyst activity. A detailed description of the methods of neutralizing catalyst activity may be found in copending application Serial No. 718,147, filed February 28, 1958 by Donald E. Hudgin and Frank M. Berardinelli.

In a preferred embodiment of this invention the polymer composition also contains a phenolic material and preferably an alkylene bisphenol as a thermal stabilizer. It appears that the stabilization action of the cycloaliphatic amine compounds and of the alkylene bisphenols enhance each other so that a mixture of a stabilizer of each class is more effective than a comparable amount of either class, by itself.

A suitable class of alkylene bisphenols includes compounds having from 1 to 4 carbon atoms in the alkylene group and having from zero to 2 alkyl suubstituents on each benzene ring, each alkyl substituent having from 1 to 4 carbon atoms. The preferred alkylene bisphenols are 2,2'-methylene bis-(5-methyl-6-tertiary butyl phenol) and 4,4'-butylidene bis-(6-tertiary butyl-3-methyl phenol). Suitable phenolic stabilizers other than alkylene bisphenols include 2,6 ditertiary butyl-4-methyl phenol, octyl phenol and p-phenyl phenol.

The cycloaliphatic amine compound is generally admixed with the oxymethylene polymer in amount not exceeding 5%, based on the weight of the oxymethylene polymer, and preferably in amount between about 2 and 0.1 weight percent. The alkylene bisphenol, when used, is admixed in amounts not exceeding 5 weight percent and preferably from about 2 to 0.1 weight percent.

The cycloaliphatic amine compounds and the alkylene bisphenols, if desired, may be admixed intimately with the oxymethylene polymer by being applied in solution in a suiutable solvent to the finely divided solid oxymethylene polymer followed by evaporation of the solvent. Methanol, ethanol and acetone are typical suitable solvents for most cycloaliphatic amines and salts.

The admixture may also be made by dry blending the finely divided oxymethylene polymer and finely divided stabilizers, by milling the stabilizers into the polymer as the latter is worked on a rubber mill or by dissolving the oxymethylene polymers and the stabilizers in a common solvent, such as dimethyl formamide, and evaporating the solvent.

The compositions of this invention may also include, if desired, plasticizers, fillers, pigments and other stabilizers.

*Example I*

5000 g. of trioxane and 5000 g. of cyclohexane were heated to 60° C. and 2.10 cc. BF$_3$-dibutyletherate in 166 cc. cyclohexane was added. The solution was in a refrigerator (0–5° C.) for 23 hours. A solid mass was obtained. This was pulverized and washed twice with hot water (90–95° C.). The polymer was dried at 75–80° C. The inherent viscosity of the polymer (measured in a 0.1% weight solution in p-chlorophenol containing 2 weight percent of α-pinene was 3.1.

Three grams of the above described polymer were slurried with a solution of 0.06 gram of dicyclohexylamide in about 15 ml. of methanol and the solvent was evaporated. A disc was molded at 190° C. and 15 p.s.i.g. for 4 minutes. The thermal degradation rate for this material (at 222° C. in an open vessel in a circulating air oven) was 1.5 wt. percent/min. Before treatment with the dicyclohexylamine the thermal degradation rate was 3.3 wt. percent/min.

*Example II*

Three grams of a copolymer having 97.5 wt. percent of units derived from trioxane and 2.5 wt. percent of units derived from dioxolane was slurried with a solution of 0.06 gram of dicyclohexylamine in about 15 ml. of methanol and the solvent was evaporated. A disc molded as in Example I had a thermal degradation rate of 0.20 wt. percent/min. for the first 5% of the polymer and 0.49 wt. percent for the remainder. Before treatment the copolymer had a thermal degradation rate of 6.0 wt. percent/min.

*Example III*

Example II was repeated except that dicyclohexylamine acetate was used instead of dicyclohexylamine. The thermal degradation rate was 0.30 wt. percent/min. for the first 5% of the polymer and 1.2 wt. percent for the remainder.

*Example IV*

Example II was repeated except that the stabilizer solution also contained 0.06 gram of 2,2'-methylene bis-(5-methyl-6-tertiary butyl phenol). The thermal degradation rate was 0.23 wt. percent/min.

*Example V*

Example III was repeated except that the stabilizer solution also contained 0.06 gram of 2,2'-methylene bis-(5-methyl-6-tertiary butyl phenol). The thermal degradation rate was 0.40 for the first 5% of polymer degraded and 0.17 for the remainder.

It is to be understood that the foregoing detailed description is given merely by way of illustration and that many variations may be made therein without departing from the spirit of our invention.

Having described our invention what we desire to secure by Letters Patent is:

1. A stabilized polymer composition comprising a moldable oxymethylene polymer having successively recurring oxymethylene groups and a stabilizing amount of cycloaliphatic amine compound of the group consisting of amines having the formula

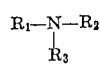

wherein $R_1$ is selected from the group consisting of monocyclic cycloalkyl and decahydronaphthyl radicals, the ring of said monocyclic cycloalkyl radicals containing up to 7 carbon atoms; and $R_2$ and $R_3$ are each selected from the group consisting of monocyclic cycloalkyl, decahydronaphthyl, lower aliphatic radicals and hydrogen, the ring of said monocyclic cycloalkyl radicals containing up to 7 carbon atoms; and salts of the aforementioned amines with carboxylic acids.

2. A stabilized polymer composition comprising a moldable oxymethylene polymer and a stabilizing amount of cycloaliphatic amine compound of the group consisting of amines having the formula

wherein $R_1$ is selected from the group consisting of monocyclic cycloalkyl and decahydronaphthyl radicals, the ring of said monocyclic cycloalkyl radicals containing up to 7 carbon atoms; and $R_2$ and $R_3$ are each selected from the group consisting of monocyclic cycloalkyl, decahydronaphthyl, lower aliphatic radicals and hydrogen, the ring of said monocyclic cycloalkyl radicals containing up to 7 carbon atoms; and salts of the aforementioned amines with carboxylic acids, said oxymethylene polymer containing oxyalkylene groups having more than one carbon atom and containing from 60 to 99.6 mol percent of oxymethylene groups.

3. A stabilized polymer composition comprising a moldable oxymethylene polymer and a stabilizing amount of cycloaliphatic amine compound of the group consisting of amines having the formula

wherein $R_1$ is selected from the group consisting of monocyclic cycloalkyl and decahydronaphthyl radicals, the ring of said monocyclic cycloalkyl radicals containing up to 7 carbon atoms; and $R_2$ and $R_3$ are each selected from the group consisting of monocyclic cycloalkyl, decahydronaphthyl, lower aliphatic radicals and hydrogen, the ring of said monocyclic cycloalkyl radicals containing up to 7 carbon atoms; and salts of the aforementioned amines with carboxylic acids, said oxymethylene polymer containing oxyethylene groups and containing from 60 to 99.6 mol percent of oxymethylene groups.

4. The polymer composition of claim 11 wherein said cycloaliphatic amine compound is a di-cycloaliphatic amine.

5. The polymer composition of claim 4 wherein said cycloaliphatic amine compound is dicyclohexylamine.

6. The polymer composition of claim 3 wherein said cycloaliphatic amine compound is a cycloaliphatic amine salt of acetic acid.

7. The polymer composition of claim 6 wherein said cycloaliphatic amine compound is dicyclohexylamine acetate.

8. The polymer composition of claim 14 wherein said alkylene bisphenol is 2,2'-methylene-bis (4-methyl-6-tertiary butyl phenol).

9. The polymer composition of claim 14 wherein said alkylene bisphenol is 4,4'-butylidene-bis (6-tertiary butyl-3-methyl phenol).

10. The polymer composition of claim 14 wherein said alkylene bisphenol is present in amounts between about 2% and 0.1%, based on the weight of oxymethylene polymer.

11. The polymer composition of claim 1 wherein said cycloaliphatic amine compound is present in an amount not exceeding 5%.

12. The polymer composition of claim 1 wherein said cycloaliphatic amine compound is present in an amount between about 0.1 and 2 weight percent.

13. The polymer composition of claim 1, containing in addition thereto a phenolic stabilizer.

14. The polymer composition of claim 3, containing in addition thereto an alkylene bisphenol.

References Cited in the file of this patent
UNITED STATES PATENTS

| | | |
|---|---|---|
| 2,829,121 | Leeper | Apr. 1, 1958 |
| 2,830,037 | Carter | Apr. 8, 1958 |
| 2,848,437 | Langsdorf et al. | Aug. 19, 1958 |
| 2,871,220 | MacDonald | Jan. 27, 1959 |
| 2,929,801 | Koller | Mar. 22, 1960 |
| 2,929,802 | Katz | Mar. 22, 1960 |
| 2,966,476 | Kralovec et al. | Dec. 27, 1960 |
| 2,998,409 | Nogare et al. | Aug. 29, 1961 |